(12) United States Patent
Zhang et al.

(10) Patent No.: US 11,321,801 B2
(45) Date of Patent: May 3, 2022

(54) GPU-BASED THIRD-ORDER LOW-RANK TENSOR COMPLETION METHOD AND THE APPARATUS

(71) Applicant: Tensor & Deep Learning Lab L.L.C., New York, NY (US)

(72) Inventors: Tao Zhang, New York, NY (US); Da Xu, New York, NY (US); Xiaoyang Liu, New York, NY (US)

(73) Assignee: Tensor & Deep Learning Lab L.L.C., New York, NY (US)

( * ) Notice: Subject to any disclaimer, the term of this patent is extended or adjusted under 35 U.S.C. 154(b) by 117 days.

(21) Appl. No.: 16/818,140

(22) Filed: Mar. 13, 2020

(65) Prior Publication Data

US 2020/0294184 A1 Sep. 17, 2020

(51) Int. Cl.
*G06T 1/20* (2006.01)
*G06F 17/16* (2006.01)

(52) U.S. Cl.
CPC .............. *G06T 1/20* (2013.01); *G06F 17/16* (2013.01)

(58) Field of Classification Search
CPC .................................. G06T 1/20; G06F 17/16
See application file for complete search history.

(56) References Cited

U.S. PATENT DOCUMENTS

| | | | | |
|---|---|---|---|---|
| 2013/0339919 A1* | 12/2013 | Baseman | ............... | G06Q 10/04 716/136 |
| 2014/0063026 A1* | 3/2014 | Oh | ........................ | G06F 1/324 345/519 |
| 2017/0076180 A1* | 3/2017 | Liu | ...................... | G06K 9/6247 |
| 2020/0408863 A1* | 12/2020 | Liang | ................. | G01R 33/5615 |
| 2021/0248459 A1* | 8/2021 | Li | ............................ | G06N 3/08 |

OTHER PUBLICATIONS

Bugai et al. ("GPU Based Computation of the Structural Tensor for Real-Time Figure Detection" WSCG Communication Proceedings, 2012, US) (Year: 2012).*
Liu et al. ("Low-tubal-rank Tensor Completion using Alternating Minimization" SPIE Defense and Security, 2016, US) (Year: 2016).*

* cited by examiner

*Primary Examiner* — Kee M Tung
*Assistant Examiner* — Khoa Vu
(74) *Attorney, Agent, or Firm* — Burns & Levinson LLP; Bruce D. Jobse

(57) ABSTRACT

The present disclosure provides a GPU-based third-order low-rank tensor completion method. Operation steps of the method includes: (1) transmitting, by a CPU, input data DATA1 to a GPU, and initializing the loop count t=1; (2) obtaining, by the GPU, a third-order tensor $Y_t$ of a current loop t based on the least squares method; (3) obtaining, by the GPU, a third-order tensor $X_t$ of the current loop t based on the least squares method; (4) checking, by the CPU, whether an end condition is met; and if the end condition is met, turning to (5); otherwise, increasing the loop count t by 1 and turning to (2) to continue the loop; and (5) outputting, by the GPU, output data DATA2 to the CPU. In the present disclosure, in the third-order low-rank tensor completion, a computational task with high concurrent processes is accelerated by using the GPU to improve computational efficiency.

8 Claims, 3 Drawing Sheets

GPU-BASED THIRD-ORDER LOW-RANK TENSOR COMPLETION METHOD AND THE APPARATUS

CROSS REFERENCE

This disclosure is based upon and claims priority to Chinese Patent Application No. 201910195941.8, filed on Mar. 15, 2019, titled "GPU-based third-order low-rank tensor completion method", and the entire contents of which are incorporated herein by reference.

TECHNICAL FIELD

The present disclosure relates generally to the field of high performance computing technologies, and more specifically, to a GPU (Graphics Processing Unit)-based third-order low-rank tensor completion method.

BACKGROUND

High-dimensional data in real world can be naturally represented as tensors. Data loss often occurs in transmission of wireless sensor networks, and therefore the collected sensory data is often incomplete. In scenarios where computing and network resources are limited, people use partial measurement to reduce the amount of data that needs to be processed and transmitted, and this also leads to incomplete data. How to recover complete data from the incomplete data is a research hotspot in recent years. A common approach is to model the incomplete data as low-rank tensors and then perform recovery by exploiting redundant features in the data.

The present disclosure mainly focuses on data completion of third-order low-rank tensors. The existing research proposes some CPU-based third-order low-rank tensor completion methods. For example, calculation for singular value decomposition of a large block diagonal matrix needs to be performed in each iteration of the TNN-ADMM method, and an iteration is performed simultaneously in the time domain and the frequency domain. Therefore, a large number of Fourier transforms and inverse Fourier transforms need to be performed. As a result, algorithm calculation is more time consuming. The accuracy and speed of the Tubal-Alt-Min method based on the alternating least squares method is better than that of the TNN-ADMM method, but computational efficiency of the Tubal-Alt-Min method is still not high. Generally, in the CPU-based third-order low-rank tensor data completion method, the running time increases exponentially with the increase of tensor size. Therefore, the CPU-based method is not suitable for processing of large-scale tensors.

A GPU has a characteristic of high parallelism and a high memory bandwidth, and therefore the GPU is widely applied to accelerate various calculations. The powerful computing power of the GPU provides a good foundation for accelerating completion of third-order low-rank tensor data.

SUMMARY

To address existing issues in the prior art, the objective of the present disclosure is to provide a third-order low-rank tensor completion method for the low-tubal-rank tensor model based on GPU.

The technical solution of the present disclosure is as follows:

A GPU-based third-order low-rank tensor completion method is provided, and operation steps include:

Step 1: transmitting, by a CPU, input data DATA1 to a GPU, and initializing the loop count t=1;

Step 2: obtaining, by the GPU, a third-order tensor $Y_t$ of a current loop t based on the least squares method;

Step 3: obtaining, by the GPU, a third-order tensor $X_t$ of the current loop t based on the least squares method;

Step 4: checking, by the CPU, whether an end condition is met; and if the end condition is met, turning to Step 5; otherwise, increasing the loop count t by 1 and turning to Step 2 to continue the loop; and Step 5: outputting, by the GPU, output data DATA2 to the CPU.

Step 1 includes:

Step 1.1: allocating memory space in a GPU memory;

Step 1.2: transmitting the input data DATA1 in a CPU memory to the allocated memory space in the GPU memory, wherein the DATA1 includes the following data:

(1) A third-order to-be-completed tensor $T \in R^{m \times n \times k}$, wherein R denotes the set of real numbers, m, n, and k are respectively sizes of the tensor T in the first, second, and third dimensions, the total number of elements of the tensor is $m \times n \times k$, and an element of the tensor that the first, second, and third dimensions are respectively i, j, and l is denoted as $T_{i,j,l}$.

(2) An observation set $S \subseteq [o] \times [p] \times [q]$, where $o \le m$, $p \le n$, and $q \le k$, where [o] denotes the set $\{1,2,\ldots,o\}$, [p] denotes the set $\{1,2,\ldots,p\}$, and [q] denotes the set $\{1,2,\ldots,q\}$.

(3) An observation tensor $TP \in R^{m \times n \times k}$ based on the observation set S and the to-be-completed tensor $T \in R^{m \times n \times k}$, wherein TP is represented by using an observation function ObserveS( ) for T, that is, TP=ObserveS(T), and the observation function ObserveS( ) is defined as:

$$TP_{i,j,l} = \begin{cases} T_{i,j,l}, & \text{if } (i, j, l) \in S \\ 0, & \text{otherwise} \end{cases} \quad (1)$$

In the method of the present disclosure, values of those elements $TP_{i,j,l}$ in TP if $(i,j,l) \in S$ are accurate and do not need to be completed.

(4) A tubal-rank r of the tensor T, wherein T(i,j,:) is defined as the $(i, j)^{th}$ tube of the tensor $T \in R^{m \times n \times k}$, and is a vector ((T(i,j,1), T(i,j,2), \ldots, T(i,j,k)) with length k; the rank of the third-order tensor is defined as the number of non-zero tubes of $\theta$ in singular value decomposition of the tensor $T=U*\theta*V$, wherein * denotes a multiplication operation of the third-order tensor, and is defined as performing tensor multiplication on third-order tensors $A \in R^{n1 \times n2 \times k}$ and $B \in R^{n2 \times n3 \times k}$ to obtain a third-order tensor $C \in R^{n1 \times n3 \times k}$:

C (i,j,:)=$\Sigma_{s=1}^{n2}$A(i,s,:)*B(s,j,:), for $i \in [n1]$ and $j \in [n3]$ (2), where [n1] denotes the set $\{1, 2, \ldots, n1\}$ and [n3] denotes the set $\{1, 2, \ldots, n3\}$.

A(i,s,:)*B(s,j,:) denotes a circular convolution for the tubes/vectors A(i,s,:) and B(s,j,:).

Step 1.3: initializing the loop variable t=1 on the CPU.

Step 2 includes:

obtaining, based on the least squares method on the GPU, a third-order tensor $Y_t$ of the current loop whose loop count is recorded as t:

$$Y_t = \underset{Y_t \in R^{r \times n \times k}}{\operatorname{argmin}} (Norm(ObserveS(T - X_{t-1} * Y_t)))^2. \quad (3)$$

The operator * in $X_{t-1} * Y_t$ in the formula (3) denotes the third-order tensor multiplication defined in the formula (2), and $X_{t-1}$ is the tensor $X_{t-1} \in R^{m \times r \times k}$ obtained after the end of the previous loop (that is, the $(t-1)^{th}$ loop), and $X_0 \in R^{m \times r \times k}$ required by the first loop is initialized to an arbitrary value, such as a random tensor; the operator—in $T - X_{t-1} * Y_t$ denotes tensor subtraction, that is, elements with an equal index (i,j,l) that are corresponding to the two tensors are subtracted; ObserveS( ) is an observation function defined in the formula (1), and Norm( ) is a function for obtaining a tensor norm, and is defined as:

$$Norm(T \in R^{m \times n \times k}) = \sqrt{\sum_{i=1}^{m}\sum_{j=1}^{n}\sum_{l=1}^{k} T_{i,j,l}^2} . \quad (4)$$

Step 3 includes:

obtaining, based on the least squares method on the GPU, a third-order tensor $X_t$ of the current loop whose loop count is recorded as t:

$$X_t = \underset{X_t \in R^{m \times r \times k}}{\text{argmin}} (Norm(ObserveS(T - X_t * Y_t)))^2. \quad (5)$$

The operator * in $X_t * Y_t$ in the formula (5) denotes the third-order tensor multiplication defined in the formula (2), $Y_t$ is the tensor $Y_t \in R^{r \times n \times k}$ obtained in Step 2, and the operator—in $T - X_t * Y_t$ denotes tensor subtraction, that is, elements with an equal index (i,j,l) that are corresponding to the two tensors are subtracted; ObserveS( ) is the observation function defined in the formula (1), and Norm( ) is the tensor norm defined in the formula (4).

Step 4 includes:

checking, by the CPU, whether the end condition is met; and if the end condition is met, turning to Step 5; otherwise, increasing the loop variable t by 1 and turning to Step 2 to continue the loop.

Step 5 includes:

transmitting, by the GPU, the output data DATA2 to the CPU, wherein the DATA2 includes third-order tensors $X \in R^{m \times r \times k}$ and $Y \in R^{r \times n \times k}$ obtained in the last loop.

Compared with the prior art, the present disclosure has the following prominent substantive features and significant technical progresses.

In the present disclosure, in third-order low-rank tensor completion, a computational task with high concurrent processes is accelerated by using a GPU to improve computational efficiency. Compared with conventional CPU-based third-order low-rank tensor completion, computational efficiency is significantly improved, and same calculation can be completed by using less time.

DETAILED DESCRIPTION

To make the objectives, technical solutions, and advantages of the present disclosure clearer, the following further describes the present disclosure in detail with reference to the accompanying drawings and the preferred embodiments. It should be understood that, the specific embodiments described herein are merely intended for explaining the present disclosure, but not for limiting the present disclosure.

Figure 2:
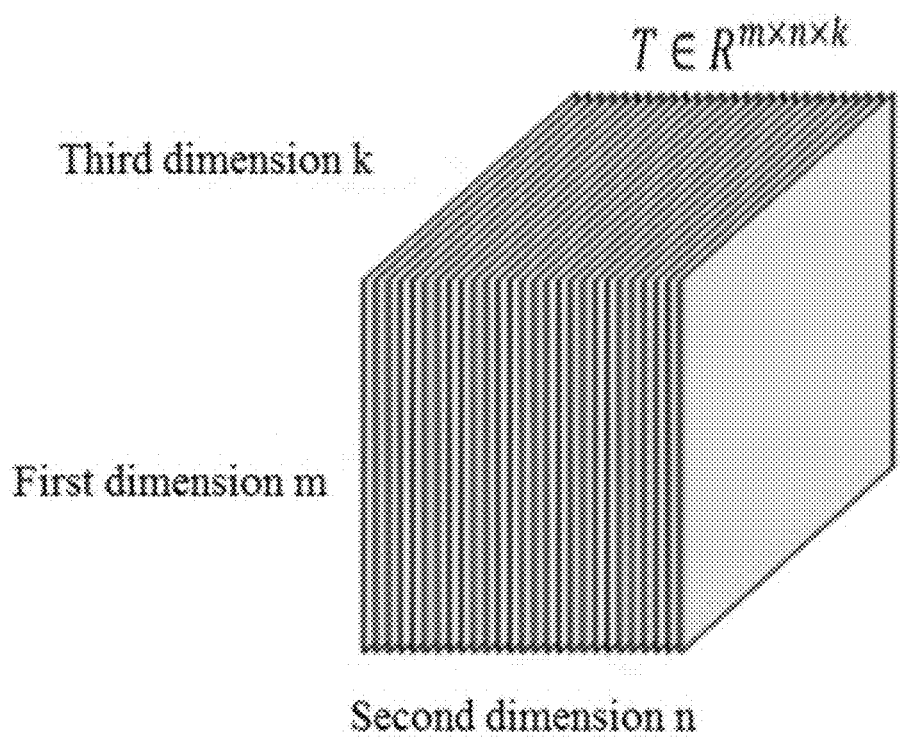
FIG. 2 is a schematic diagram of a third-order tensor.

A third-order tensor is shown in FIG. 2. A first dimension of the tensor is also referred to as a row, and a size of the row is m, a second dimension is also referred to a column, and a size of the column is n, a size of the third dimension is k. In this way, a real value tensor may be denoted as $T \in R^{m \times n \times k}$, and a complex value tensor may be denoted as $T \in C^{m \times n \times k}$, where C denotes the set of complex numbers. T(i,j,l) denotes an element that the first, second, and third dimensions of the tensor T are respectively i, j, l, T(i,j,:) denotes one-dimensional vector formed by k elements: T(i,j,1), T(i,j,2), . . . , T(i,j,k), and the one-dimensional vector T(i,j,:) is along the third dimension, and is referred to the $(i,j)^{th}$ tube of the tensor. The tensor $T \in R^{m \times n \times k}$ has m×n tubes.

Embodiment 1

Figure 1:
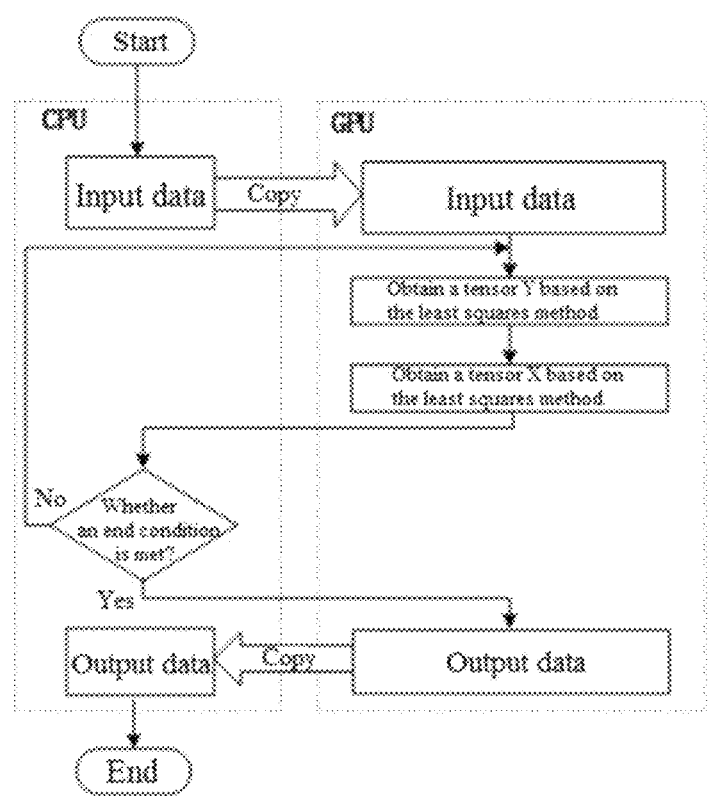
FIG. 1 is a diagram of steps of a GPU-based third-order low-rank tensor completion method of the present disclosure.

A GPU-based third-order low-rank tensor completion method is provided. As shown in FIG. 1, steps are as follows:

Step 1: A CPU transmits input data DATA1 to a GPU, and initializes the loop count t=1.

Step 2: The GPU obtains a third-order tensor $Y_t$ of a current loop t based on the least squares method.

Step 3: The GPU obtains a third-order tensor $X_t$ of the current loop t based on the least squares method;

Step 4: The CPU checks whether an end condition is met; and if the end condition is met, turns to Step 5; otherwise, increases the loop count t by 1 and turns to Step 2 to continue the loop; and Step 5: The GPU outputs output data DATA2 to the CPU.

Embodiment 2: this Embodiment is Basically the Same as Embodiment 1, and Special Features are as Follows Step 1 includes the following steps:

Step 1.1: Memory space is allocated in a GPU memory.

Step 1.2: The input data DATA1 in a CPU memory is transmitted to the allocated memory space in the GPU memory. The DATA1 includes the following data:

(1) A third-order to-be-completed tensor $T \in R^{m \times n \times k}$, wherein R denotes the set of real numbers, m, n, and k are respectively sizes of the tensor T in the first, second, third dimensions, the total number of elements of the tensor is m×n×k, and an element of the tensor that the first, second, and third dimensions are respectively i, j, and l is denoted as $T_{i,j,l}$.

(2) An observation set $S \subseteq [o] \times [p] \times [q]$, wherein o≤m, p≤n, q≤k.

(3) An observation tensor $TP \in R^{m \times n \times k}$ based on the observation set S and the to-be-completed tensor $T \in R^{m \times n \times k}$, wherein TP is represented by using an observation function ObserveS( ) for T, that is, TP=ObserveS(T), and the observation function ObserveS( ) is defined as:

$$TP_{i,j,l} = \begin{cases} T_{i,j,l}, & \text{if } (i, j, l) \in S \\ 0, & \text{otherwise} \end{cases} \quad (1)$$

In the method of the present disclosure, values of those elements $TP_{i,j,l}$ in TP if $(i,j,l)\in S$ are accurate and do not need to be completed.

(4) A tubal-rank r of the tensor T, wherein T(i,j,:) is defined as the $(i,j)^{th}$ tube of the tensor $T\in R^{m\times n\times k}$, and is a vector $((T(i,j,1), T(i,j,2), \ldots, T(i,j,k))$ with length k; the tubal-rank of the third-order tensor is defined as the number of non-zero tubes of θ in singular value decomposition of the tensor T=U*θ*V, wherein * denotes a multiplication operation of the third-order tensor, and is defined as performing tensor multiplication on third-order tensors $A\in R^{n1\times n2\times k}$ and $B\in R^{n2\times n3\times k}$ to obtain a third-order tensor $C\in R^{n1\times n3\times k}$:

$$C(i,j,:) = \sum_{s=1}^{n2} A(i,s,:)*B(s,j,:), \text{ for } i\in[n1] \text{ and } j\in[n3] \quad (2)$$

where [n1] denotes the set {1, 2, ..., n1} and [n3] denotes the set {1, 2, ..., n3}.

A(i,s,:)*B(s,j,:) denotes performing a circular convolution for the tubes/vectors A(i,s,:) and B(s,j,:).

Step 2 includes the following step:

A third-order tensor $Y_t$ of the current loop whose loop count is recorded as 1 is obtained based on the least squares method on the GPU:

$$Y_t = \underset{Y_t \in R^{r\times n\times k}}{\operatorname{argmin}} (Norm(ObserveS(T - X_{t-1}*Y_t)))^2. \quad (3)$$

The operator * in $X_{t-1}*Y_t$ in the formula (3) denotes the third-order tensor multiplication defined in the formula (2), and $X_{t-1}$ is the tensor $X_{t-1}\in R^{m\times r\times k}$ obtained after the end of the previous loop (that is, the $(t-1)^{th}$ loop), and $X_0\in R^{m\times r\times k}$ required by the first loop is initialized to an arbitrary value, such as a random tensor; the operator—in $T-X_{t-1}*Y_t$ denotes tensor subtraction, that is, elements with an equal index (i,j,l) that are corresponding to the two tensors are subtracted; ObserveS( ) is an observation function defined in the formula (1), and Norm( ) is a function for obtaining a tensor norm, and is defined as:

$$Norm(T \in R^{m\times n\times k}) = \sqrt{\sum_{i=1}^{m}\sum_{j=1}^{n}\sum_{l=1}^{k} T_{i,j,l}^2}. \quad (4)$$

Step 3 includes the following step:

A third-order tensor $X_t$ of the current loop whose loop count is recorded as t is obtained based on the least squares method on the GPU:

$$X_t = \underset{X_t \in R^{m\times r\times k}}{\operatorname{argmin}} (Norm(ObserveS(T - X_t*Y_t)))^2. \quad (5)$$

The operator * in $X_t*Y_t$ in the formula (5) denotes the third-order tensor multiplication defined in the formula (2), $Y_t$ is the tensor $Y_t\in R^{r\times n\times k}$ obtained in Step 2, and the operator—in $T-X_t*Y_t$ denotes tensor subtraction, that is, elements with an equal index (i,j,l) that are corresponding to the two tensors are subtracted; ObserveS( ) is the observation function defined in the formula (1), and Norm( ) is the tensor norm defined in the formula (4).

Step 4 includes the following step:

The CPU checks whether the end condition is met; and if the end condition is met, turns to Step 5; otherwise, increases the loop variable t by 1 and turns to Step 2 to continue the loop. The end condition may be that a certain loop count or an error threshold is reached.

Step 5 includes the following step:

The GPU transmits the output data DATA2 to the CPU, wherein the DATA2 includes third-order tensors $X\in R^{m\times r\times k}$ and $Y\in R^{r\times n\times k}$ obtained in the last loop. A third-order tensor T'=X*Y after completion can be obtained by performing tensor multiplication defined in the formula (2) for X and Y.

Figure 3:
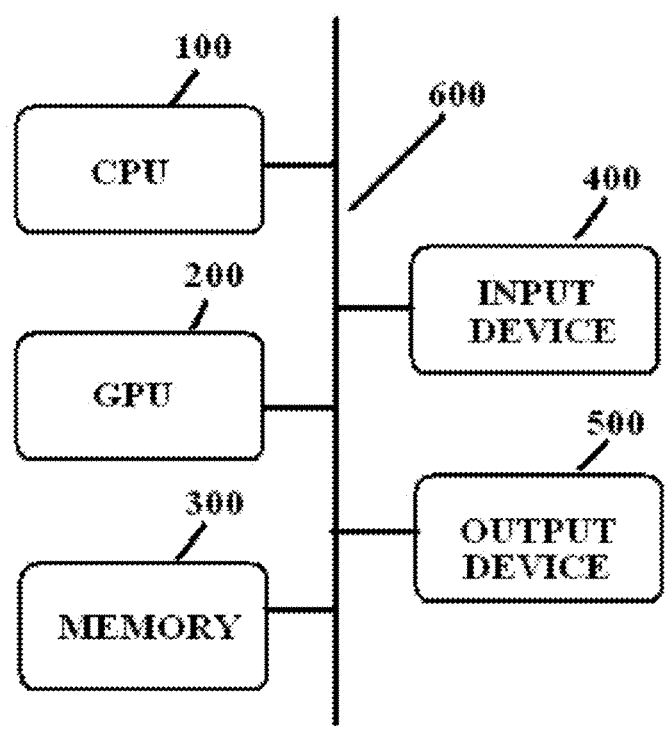
FIG. 3 is a schematic diagram illustrating another embodiment of this disclosure wherein the apparatus comprises an input device, an output device, a CPU, a GPU, memory so that the input device and the output device are all communicably connected through a bus.

The disclosure further provides an apparatus, comprising a CPU 100; a GPU 200, communicably connected with the CPU 100; a memory 300 communicably connected with the CPU 100 and GPU 200 for storing instructions executable by the CPU 100 and GPU 200, to perform any of the abovementioned methods. Referring to FIG. 3, in one embodiment of this disclosure, the apparatus also comprises an input device 400 and output device 500, and the CPU 100, the GPU 200, the memory 300, the input device 400, and the output device are all communicably connected through a bus 600.

What is claimed is:

1. A GPU-based third-order low-rank tensor completion method, wherein operation steps comprise:

Step 1: transmitting, by a CPU, input data DATA1 to a GPU, and initializing the loop count t=1;

Step 2: obtaining, by the GPU, a third-order tensor $Y_t$ of a current loop t based on the least squares method;

Step 3: obtaining, by the GPU, a third-order tensor $X_1$ of the current loop t based on the least squares method;

Step 4: checking, by the CPU, whether an end condition is met; and if the end condition is met, turning to Step 5; otherwise, increasing the loop count t by 1 and turning to Step 2 to continue the loop; and Step 5: outputting, by the GPU, output data DATA2 to the CPU, wherein Step 1 comprises:

Step 1.1: allocating memory space in a GPU memory;

Step 1.2: transmitting the input data DATA1 in a CPU memory to the allocated memory space in the GPU memory, wherein the DATA1 comprises the following data:

(1) a third-order to-be-completed tensor $T\in R^{m\times n\times k}$, wherein R denotes the set of real numbers, m, n, and k are respectively sizes of the tensor T in the first, second, and third dimensions, the total number of elements of the tensor is m×n×k, and an element of the tensor that the first, second, and third dimensions are respectively i, j, and l is denoted as $T_{i,j,l}$;

(2) an observation set $S\subseteq[o]\times[p]\times[q]$, wherein o≤m, p≤n, q≤k;

(3) an observation tensor $TP\in R^{m\times n\times k}$ based on the observation set S and the to-be-completed tensor $T\in R^{m\times n\times k}$, wherein TP is represented by using an observation function ObserveS( ) for T, that is, TP=ObserveS(T), and the observation function ObserveS( ) is defined as:

$$TP_{i,j,l} = \begin{cases} T_{i,j,l}, & \text{if } (i, j, l) \in S \\ 0, & \text{otherwise} \end{cases}, \quad (1)$$

wherein values of those elements $TP_{i,j,l}$ in TP if $(i, j, l)\in S$ need to be accurate and do not need to be completed; and (4) a tubal-rank r of the tensor T, wherein T(i, j, :) is defined as the $(i, j)^{th}$ tube of the tensor $T\in R^{m\times n\times k}$, and is a vector $((T (i, j, 1), T (i, j, 2), \ldots, T(i, j, k))$ with length k; the rank of the third-order tensor is defined as the number of non-zero tubes of θ in singular value decomposition of the tensor T=U*θ*V, wherein * denotes a multiplication operation of the third-order tensor, and is defined as performing tensor multiplication on third-order tensors $A \in R^{n1 \times n2 \times k}$ and $B \in R^{n2 \times n3 \times k}$ to obtain a third-order tensor $C \in R^{n1 \times n3 \times k}$:

$$C(i, j, :) = \Sigma_{s=1}^{n2} A(i, s, :) * B(s, j, :), \text{ for } i \in [n1] \text{ and } j \in [n3] \quad (2),$$

wherein $A(i, s, :) * B(s, j, :)$ denotes performing a circular convolution for the tubes/vectors; and Step 1.3: initializing the loop variable t=1 on the CPU.

2. The GPU-based third-order low-rank tensor completion method according to claim 1, wherein Step 2 comprises:

obtaining, based on the least squares method on the GPU, a third-order tensor $Y_t$ of the current loop whose loop count is recorded as t:

$$Y_t = \underset{Y_t \in R^{r \times n \times k}}{\mathrm{argmin}}\ (Norm(ObserveS(T - X_{t-1} * Y_t)))^2, \quad (3)$$

wherein the operator * in $X_{t-1} * Y_t$ in the formula (3) denotes the third-order tensor multiplication defined in the formula (2), and $Xt_{t-1}$ is the tensor $X_{t-1} \in R^{m \times r \times k}$ obtained after the end of the previous loop (that is, the $(t-1)^{th}$ loop), and $X_0 \in R^{m \times r \times k}$ required by the first loop is initialized to an arbitrary value, such as a random tensor; the operator—in $T - X_{t-1} * Y_t$ denotes tensor subtraction, that is, elements with an equal index (i, j, l) that are corresponding to the two tensors are subtracted; ObserveS( ) is an observation function defined in the formula (1), and Norm( ) is a function for obtaining a tensor norm, and is defined as:

$$Norm(T \in R^{m \times n \times k}) = \sqrt{\sum_{i=1}^{m} \sum_{j=1}^{n} \sum_{l=1}^{k} T_{i,j,l}^2}. \quad (4)$$

3. The GPU-based third-order low-rank tensor completion method according to claim 1, wherein Step 3 comprises:

obtaining, based on the least squares method on the GPU, a third-order tensor $X_1$ of the current loop whose loop count is recorded as 1:

$$X_t = \underset{X_t \in R^{m \times r \times k}}{\mathrm{argmin}}\ (Norm(ObserveS(T - X_t * Y_t)))^2, \quad (5)$$

wherein the operator * in $X_t * Y_t$ in the formula (5) denotes the third-order tensor multiplication defined in the formula (2), $Y_t$ is the tensor $Y_t \in R^{r \times n \times k}$ obtained in Step 2, and the operator—in $T - X_t * Y_t$ denotes tensor subtraction, that is, elements with an equal index (i,j, l) that are corresponding to the two tensors are subtracted; ObserveS( ) is the observation function defined in the formula (1), and Norm( ) is the tensor norm defined in the formula (4).

4. The GPU-based third-order low-rank tensor completion method according to claim 1, wherein Step 4 comprises:

checking, by the CPU, whether the end condition is met; and if the end condition is met, turning to Step 5; otherwise, increasing the loop variable t by 1 and turning to Step 2 to continue the loop.

5. The GPU-based third-order low-rank tensor completion method according to claim 1, wherein Step 5 comprises:

transmitting, by the GPU, the output data DATA2 to the CPU, wherein the DATA2 comprises third-order tensors $X \in R^{m \times r \times k}$ and $Y \in R^{r \times n \times k}$ obtained in the last loop.

6. An apparatus comprising:
a CPU;
a GPU, communicably connected with the CPU; and
a memory communicably connected with the CPU and GPU for storing instructions executable by the CPU and GPU, to perform the method according to claim 1.

7. A method for a GPU-based third-order low-rank tensor completion comprising the steps of:
(1) transmitting, by a CPU, input data DATA1 to a GPU, and initializing the loop count t=1;
(2) obtaining, by the GPU, a third-order tensor Y.sub.t of a current loop t based on the least squares method;
(3) obtaining, by the GPU, a third-order tensor X.sub.t of the current loop t based on the least squares method;
(4) checking, by the CPU, whether an end condition is met; and
(5) if the end condition is met, outputting, by the GPU, output data DATA2 to the CPU, wherein Step (1) comprises:

Step 1.1: allocating memory space in a GPU memory;
Step 1.2: transmitting the input data DATA1 in a CPU memory to the allocated memory space in the GPU memory, wherein the DATA1 comprises the following data:
(1) a third-order to-be-completed tensor $T \in R^{m \times n \times k}$, wherein R denotes the set of real numbers, m, n, and k are respectively sizes of the tensor T in the first, second, and third dimensions, the total number of elements of the tensor is m×n×k, and an element of the tensor that the first, second, and third dimensions are respectively i, j, and l is denoted as $T_{i, j, l}$;
(2) an observation set $S \subseteq [o] \times [p] \times [q]$, wherein o≤m, p≤n, q≤k;
(3) an observation tensor $TP \in R^{m \times n \times k}$ based on the observation set S and the to-be-completed tensor $T \in R^{m \times n \times k}$, wherein TP is represented by using an observation function ObserveS( ) for T, that is, TP=ObserveS(T), and the observation function ObserveS( ) is defined as:

$$TP_{i,j,l} = \begin{cases} T_{i,j,l}, & \text{if } (i, j, l) \in S \\ 0, & \text{otherwise} \end{cases}, \quad (1)$$

wherein values of those elements $TP_{i, j, l}$ in TP if (i, j, l)∈S need to be accurate and do not need to be completed; and
(4) a tubal-rank r of the tensor T, wherein T(i, j, :) is defined as the (i, j)$^{th}$ tube of the tensor $T \in R^{m \times n \times k}$, and is a vector ((T (i, j, 1), T (i, j, 2), . . . , T(i, j, k)) with length k; the rank of the third-order tensor is defined as the number of non-zero tubes of theta in singular value decomposition of the tensor T=U*θ*V wherein * denotes a multiplication operation of the third-order tensor, and is defined as performing tensor multiplication on third-order tensors $A \in R^{n1 \times n2 \times k}$ and $B \in R^{n2 \times n3 \times k}$ to obtain a third-order tensor $C \in R^{n1 \times n3 \times k}$:

$C(i,j,:) = \Sigma_{s=1}^{n2} A(i,s,:) * B(s,j,:)$, for $i \in [n1]$ and $j \in [n3]$ (2), wherein $A(i, s, :) * B(s, j, :)$ denotes performing a circular convolution for the tubes/vectors; and Step 1.3: initializing the loop variable t=1 on the CPU.

8. A method as recited in claim 7, further comprising the steps of:
if the end condition is not met, increasing the loop count t by 1; and returning to step (2).

* * * * *